(12) United States Patent
Levy et al.

(10) Patent No.: US 8,164,515 B2
(45) Date of Patent: Apr. 24, 2012

(54) METHODS AND APPARATUS TO LOCATE A WIRELESS DEVICE

(75) Inventors: David Levy, Villach (AT); Avraham Baum, Giv'at-Shmuel (IL); Leonardo William Estevez, Rowlett, TX (US)

(73) Assignee: Texas Instruments Incorporated, Dallas, TX (US)

( * ) Notice: Subject to any disclaimer, the term of this patent is extended or adjusted under 35 U.S.C. 154(b) by 155 days.

(21) Appl. No.: 12/775,288

(22) Filed: May 6, 2010

(65) Prior Publication Data
US 2010/0283679 A1  Nov. 11, 2010

Related U.S. Application Data

(60) Provisional application No. 61/176,327, filed on May 7, 2009, provisional application No. 61/254,001, filed on Oct. 22, 2009.

(51) Int. Cl.
*G01S 19/51* (2010.01)
*G01S 3/02* (2006.01)
(52) U.S. Cl. .................. 342/357.34; 342/463
(58) Field of Classification Search ............. 342/357.34, 342/357.49, 450, 451, 463; 701/207, 213, 701/412, 468
See application file for complete search history.

(56) References Cited

U.S. PATENT DOCUMENTS

| | | | | |
|---|---|---|---|---|
| 2008/0010367 A1* | 1/2008 | Chen et al. | ..................... | 709/223 |
| 2009/0017837 A1* | 1/2009 | Kim et al. | ................... | 455/456.1 |
| 2011/0028161 A1* | 2/2011 | Larsen | ........................ | 455/456.1 |

* cited by examiner

*Primary Examiner* — Dao Phan
(74) *Attorney, Agent, or Firm* — James R. Pessetto; W. James Brady; Frederick J. Telecky, Jr.

(57) ABSTRACT

Methods and apparatus to locate a wireless device are described. A disclosed example method includes transmitting a request location message from a first wireless station to a second wireless station to determine a geographic location of a third wireless station, receiving a response location message at the first wireless station from the second wireless station identifying the geographic location of the third wireless station, wherein the second wireless station stores the geographic location of the third wireless station, determining a path from the first wireless station to a range of the third wireless station based on the received geographic location of the third wireless station, moving along a portion of the path with the first wireless station to the range of the third wireless station, and transmitting an association message from the first wireless station to the third wireless station to communicably couple the first wireless station to the third wireless station.

18 Claims, 9 Drawing Sheets

METHODS AND APPARATUS TO LOCATE A WIRELESS DEVICE

RELATED APPLICATIONS

This application claims the benefit U.S. Provisional Application No. 61/176,327, filed May 7, 2009, the entirety of which is incorporated by reference and U.S. Provisional Application No. 61/254,001, filed Oct. 22, 2009, the entirety of which is incorporated by reference.

FIELD OF THE DISCLOSURE

This disclosure relates generally to wireless devices and, more particularly, to methods and apparatus to locate a wireless device.

BACKGROUND

Many wireless devices include Global Positioning Systems (GPS) receivers to receive high frequency signals from GPS satellites. High frequency satellite signals may be used by a GPS receiver to identify a geographic location of the receiver by decoding the signals and calculating a distance to the satellites based on a strength and/or a propagation time of the received signals. The geographic location may include latitude, longitude, and/or altitude. A wireless device may use geographic location information from the GPS receiver in navigation applications, mapping applications, emergency location applications, and/or social media applications.

Currently, GPS-related applications operated on a wireless device may have to send requests for geographic locations of other wireless devices and/or points of interest through a cellular communication network to access a database of stored geographic locations. For example, a wireless device operating a mapping application may send a query for coffee shops with wireless local area networks within a half mile radius of the wireless device. To receive the geographic location of the coffee shops, the wireless device transmits its geographic location to the mapping application, which then accesses a database to determine coffee shops with network access points within a half mile of the provided geographic location. The mapping application may then transmit a list of matching coffee shops with approximately matching geographic locations. However, in some instances, a wireless device may not be able to communicate with a network through cellular communication channels (e.g., from signal degradation or network traffic congestion in urban environments). In these instances, a wireless device may not be able communicate with a network to obtain geographic locations of points of interest.

SUMMARY

Methods and apparatus to locate a wireless device are described. An example method includes transmitting a request location message from a first wireless station to a second wireless station to determine a geographic location of a third wireless station and receiving a response location message at the first wireless station from the second wireless station identifying the geographic location of the third wireless station, wherein the second wireless station stores the geographic location of the third wireless station. The example method also includes determining a path from the first wireless station to a range of the third wireless station based on the received geographic location of the third wireless station, moving along a portion of the path with the first wireless station to the range of the third wireless station, and transmitting an association message from the first wireless station to the third wireless station to communicably couple the first wireless station to the third wireless station.

In another example, an apparatus includes a probe manager included within a first wireless station to transmit a request location message to a second wireless station to determine a geographic location of a third wireless station and receive a response location message from the second wireless station identifying the geographic location of the third wireless station. Further, the example apparatus includes a global positioning system processor to determine a path to a range of the third wireless station based on the received geographic location of the third wireless station and determine when the first wireless station is within the range of the third wireless station. The example apparatus also includes an application processor to transmit an association message to the third wireless station to communicably couple to the third wireless station.

DETAILED DESCRIPTION

Figure 1:
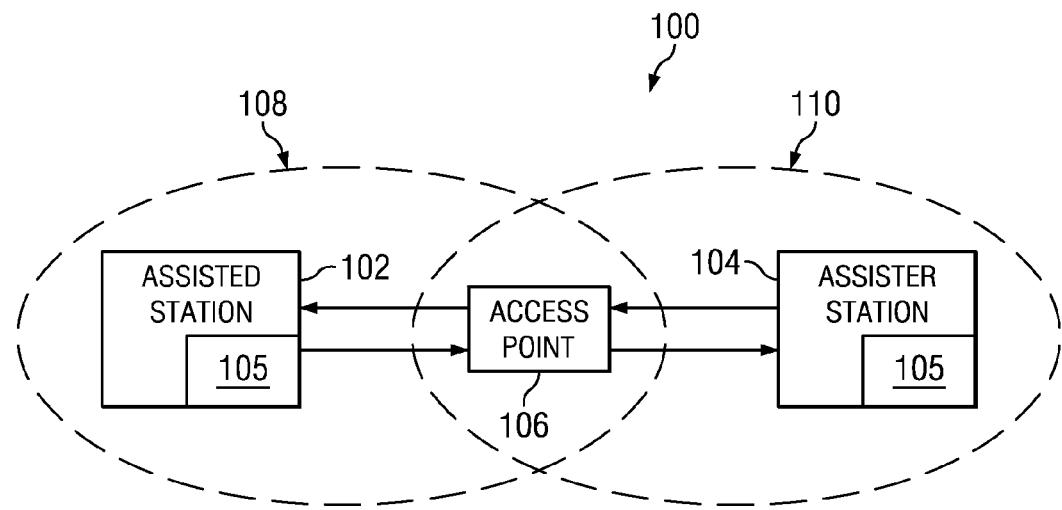
FIG. 1 shows a communications network with an example assisted station outside a communication range of an example assistor station.

Certain examples are shown in the above-identified figures and described in detail below. In describing these examples, like or identical reference numbers may be used to identify common or similar elements. The figures are not necessarily to scale and certain features and certain views of the figures may be shown exaggerated in scale or in schematic for clarity and/or conciseness. Although the following discloses example methods and apparatus, it should be noted that such methods and apparatus are merely illustrative and should not be considered as limiting. The example wireless stations described herein may be implemented using cellular telephones, smartphones, wireless personal digital assistants (PDAs), wireless laptops, wireless netbooks, e-readers, wireless computing pads, wireless access points, etc. Accordingly, while the following describes example methods and apparatus, persons of ordinary skill in the art will readily appreciate that the examples are not the only way to implement such methods and apparatus.

The example methods and apparatus described herein utilize GPS receivers that are included within wireless stations. These Global Position System (GPS) receivers determine a geographic location of a wireless station based on triangulation coordinate calculations of multiple GPS satellite signals. These calculations determine a distance between a GPS receiver and satellites based on signal strength and/or transmission propagation time and use the overlapping distances to pinpoint its geographic location. In some examples, a GPS receiver may refine the calculation based on differential GPS information provided by local access points or wireless base stations to account for local variations in signal speed. The GPS calculations may provide a wireless station with geographic location information including latitude, longitude, and/or altitude.

Currently, GPS enabled wireless stations utilize GPS-based applications (e.g., direction applications, mapping applications, etc.) by transmitting a geographic location of a wireless station via a cellular communication channel (e.g., General Packet Radio Service (GPRS)) to a service that stores geographic locations of other wireless stations, points of interest, commercial addresses, residential addresses, etc. The service compares, matches, and/or calculates a distance between the wireless device and geographic locations requested by the wireless station. The wireless station then receives a response from the service via the cellular channel with the results of the request. However, in some instances, the wireless station may not be able to communicate with the service due to network congestion, poor wireless reception, and/or unavailability of the service. In other instances, the database of the service may not include geographic locations to support some requests.

The example methods and apparatus described herein may be used to quickly and efficiently provide peer-to-peer geographic location sharing information. The example methods and apparatus described herein implement a message protocol that enables wireless stations or access points to share geographic location information that may be used by the wireless stations to locate wireless local area networks (WLANs), access points, specific wireless stations, portable wireless-fidelity (Wi-Fi) stations, mobile access points, and/or any other wireless device. In one example, a wireless station may broadcast a request for an access point hosting a WLAN. Another wireless station within range and/or within a basic service set (BSS) hosted by an access point may respond to the request with coordinates specifying the geographic location of the access point. The requesting wireless station may then use this geographic location to provide directions to a user to find the access point or the BSS associated with the access point.

In another example, the methods and apparatus described herein may be used to establish direct wireless connections between wireless stations to share data. For example, a wireless station may transmit a request for a type of data (e.g., a movie or a song) via a WLAN hosted by an access point. The access point may distribute the request to other wireless stations within a BSS associated with the access point. One of the other wireless stations may determine that it has the requested data and sends a response including an acknowledgement of the requested data and its geographic location. The requesting station may then use the geographic location to map a path and find the wireless station. When the wireless stations are within a range of each other, they may open a direct wireless communication link to quickly communicate the requested data.

The example methods and apparatus described herein may support fixed and/or portable access points. In some examples, a wireless station may connect to a mobile access point (e.g., the Novatel Wireless MiFi™) that hosts IEEE 802.11 based Wi-Fi. In these examples, the mobile access point may download and cache data requested by the wireless station until the data can be transmitted to the wireless station. In yet other examples, the methods and apparatus described herein may be used within a mesh-type network of wireless stations that store geographic locations of other in-range wireless stations. In this manner, a wireless station may send a request to locate a specific type of wireless enabled station. The request may propagate through the mesh network of stations until a matching station is located. Thus, the example methods and apparatus described herein may be used to share geographic location information so that a wireless station may determine a distance and/or a direction to a desired service and/or network hosted by an access point and/or another wireless station.

FIG. 1 shows a communications network 100 with an example assisted station 102 outside a communication range of an example assistor station 104. The stations 102 and 104 include a peer-to-peer geographic location sharing capability 105. The stations 102 and 104 are wirelessly communicatively coupled to an access point 106 via respective BSSs 108 and 110. Specifically, the assisted station 102 and the access point 106 are included within the BSS 108 and the assister station 104 and the access point 106 are included within the BSS 110. Additionally, the BSSs 108 and 110 may be part of a single BSS managed and/or hosted by the access point 106. Further, the example of FIG. 1 may include other wireless stations (not shown). Additionally, the access point 106 may manage different sized BSSs (not shown).

The stations 102 and 104 are wireless devices that may include any type of cell phone, smartphone, wireless enabled laptop, wireless enabled e-reader or tablet, and/or any other wireless device configured to exchange information with the access point 106. The example stations 102 and 104 also include GPS receivers that provide the stations 102 and 104 respective latitude, longitude and/or altitude information for the peer-to-peer geographic location sharing capability 105. The stations 102 and 104 may support IEEE 802.11 standards including, but not limited to, IEEE 802.11s, IEEE 802.11u, and IEEE 802.11v. By supporting IEEE 802.11v, the example stations 102 and 104 may share geographic location using a message protocol defined by the IEEE 802.11v specification, the entirety of which is incorporated by reference.

In the example of FIG. 1, the assisted station 102 may transmit requests for data via the access point 106, which may function as a pass through of communications between the stations 102 and 104. In this example, the access point 106 distributes the request for data from the assisted station 102 to any station within a BSS of the access point 106 (e.g., the BSSs 108 and 110). The assister station 104 may receive this request, determine that it has the requested data, and send a response back to the assisted station 102 via the access point 106. The response may indicate that the assister station 104 has the requested data. In another example, the assisted station 102 may join the BSS 108 and learn through a file sharing service that the assister station 104 has the desired data. The data shared between the stations 102 and 104 may include any type of media file (e.g., a song, a movie, a video clip, a game), document, program file, and/or any other type of data that may be shared between stations 102 and 104.

Upon determining that the assister station 104 has the desired data, the assisted station 102 may transmit a request location message to the assister station 104. The request location message may include a media access control (MAC) address of the assisted station 102. The assister station 104 may then reply to the request with a response location message that includes its MAC address and geographic location. The assisted station 102 uses the geographic location of the assister station 104 and its own geographic location to calculate a distance and/or direction to the assister station 104.

In other examples where the access point 106 may not have the MAC address and/or service information associated with the assister station 104, the assisted station 102 may access a server via a cellular network and/or any other type of network to access the MAC address. In this manner, the assister station 104 enables a trust relationship with the assisted station 102 by providing its MAC address to the server. For example, the assister station 104 may provide its MAC address to a social network server. The assisted station 102 may access this social network server to determine the MAC address of the assister station 104. In these other examples, the assister station 104 may only want to provide its MAC address to the assisted station 102.

In examples where the assister station 104 is moving, a remote server may experience scalability issues attempting to communicate the geographic location of the assister station 104. For example, a mobile augmented reality application hosted by a social networking server may have a graphical overlay created by a user of the assister station 104. The assisted station 102, via the social network server, may determine the MAC address of the assister station 104 and update the graphical overlay, thereby locally updating the mobile augmented reality application with the geographic location of the assisted station 102. In this manner, the assisted station 102 provides its geographic location instead of the assister station 104 broadcasting its geographic location to any wireless station that accesses and/or updates the graphical overlay.

Figure 2:
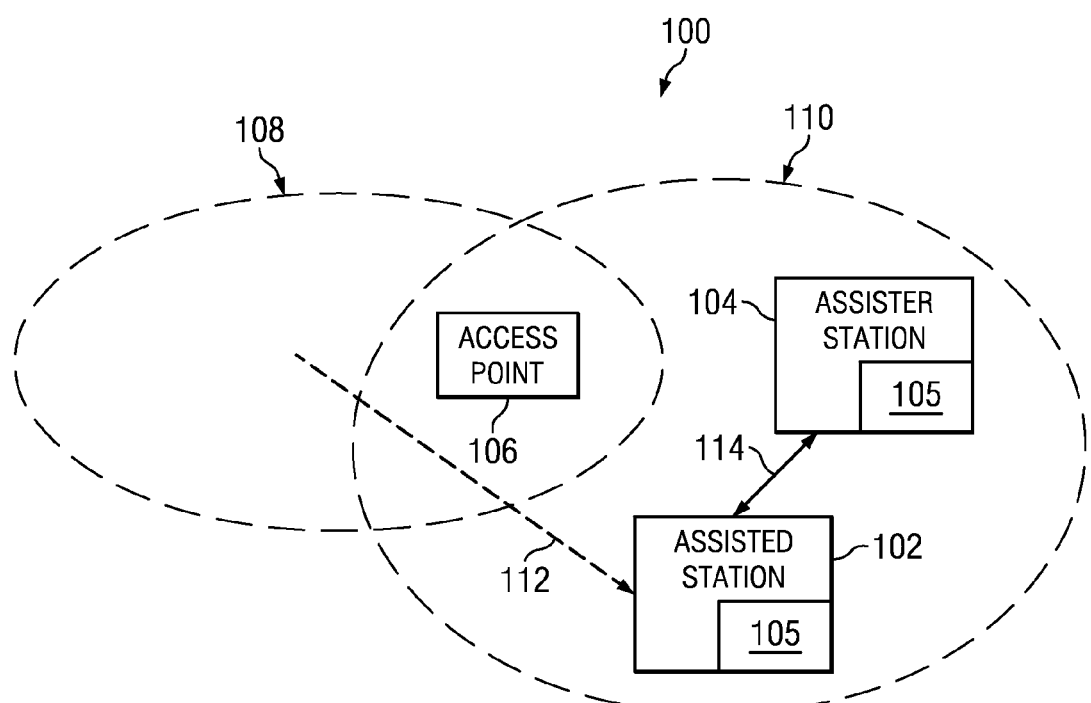
FIG. 2 shows the example assisted station of FIG. 1 within range of the example assistor station.

FIG. 2 shows that after the location of the assister station 104 is determined, a user of the assisted station 102 may then move in the calculated direction along a path 112 until the assisted station 102 is within a communication range (e.g., within the BSS 110) of the assister station 104. In some examples, the assisted station 102 may use a map application to provide specific directions to reach the assister station 104. Further, the assisted station 108 may determine that it is within the BSS 110 by periodically sending connection request messages addressed to the MAC address of the assister station 104 until the assister station 104 responds. In this manner, the assisted station 102 can move within range of the assister station 104 without having to know the location of the access point 106.

Once the assisted station 102 is within the BSS 110 and/or within direct communication range of the assistor station 104, the stations 102 and 104 may form a direct communication link 114 (e.g., Bluetooth™, Zig-Bee™, wireless Universal Serial Bus (USB), etc.) using the previously exchanged MAC addresses. The communication link 114 may be formed by any request/response and/or request/report protocol for establishing a direct communication link. The direct communication link 114 enables the stations 102 and 104 to transmit the requested data faster and/or more efficiently than transferring the data through a network via the access point 106. Thus, by the assister station 104 sharing its geographic location, the stations 102 and 104 may establish a high speed direct communication link when the stations are initially beyond direct link range.

Prior to the assister station 104 providing its geographic location to the assisted station 102, the assister station 104 may determine if a trust relationship exists with the assisted station 102. The assister station 104 may determine if a trust relationship exists by determining if an internal permissions database includes a MAC address of the assisted station 102. Alternatively, the assister station 104 may prompt a user for permission and/or authorization to send the geographic location information. Additionally or alternatively, a trust relationship may be prearranged via social network applications that may authenticate the assisted station 102 based on the MAC address and/or any other credentials (e.g., a username or user identification) provided by the assisted station 102 within the request location message. Further, a user of the assister station 104 may disable permissions by setting a bit to decline all requests for geographic location information. The assister station 104 may also determine if a trust relationship exists prior to granting a connection to establish the direct communication link 114.

In some examples, the assister station 104 of FIG. 2 may also be a mobile access point. In these examples, the assister station 104 may provide a service that the assisted station 102 may access via the direct communication link 114. For example, the assister station 104 may be a Wi-Fi hub with a wireless connection to the access point 106. The assisted station 102 may directly connect to the assister station 104 for data and/or voice services. In this example, the assister station 102 may download and/or cache data requested by the assisted station 102. Because the assisted station 102 may have a slower network connection and/or may not be Wi-Fi enabled, the assister station 104 may download the data faster and more efficiently and transmit this data to the assisted station 102 through the relatively faster direct communication line 114.

Figure 3:
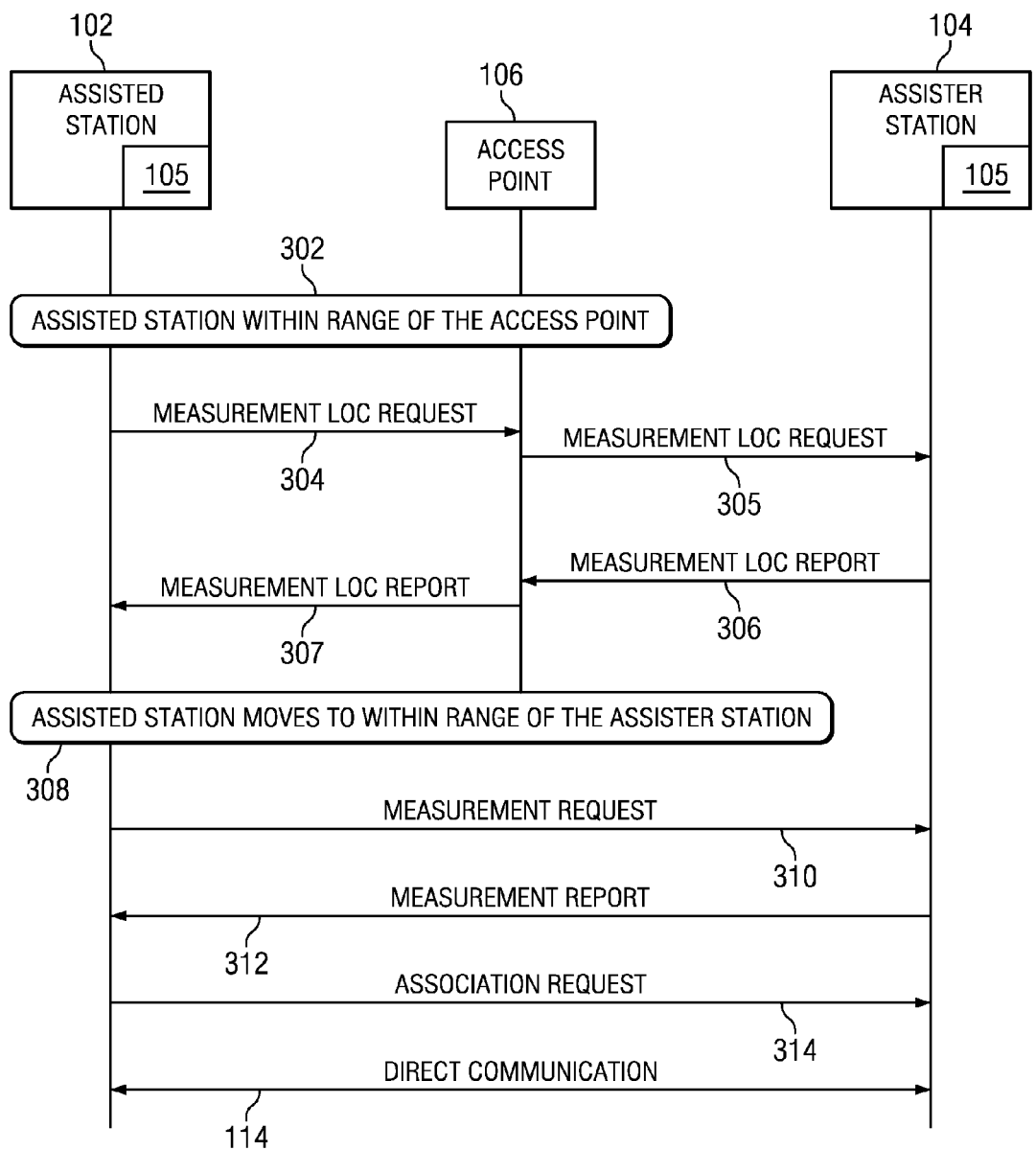
FIG. 3 shows a message flow diagram of messages between the example assisted station, the example assistor station, and an access point of FIGS. 1 and 2.

FIG. 3 shows a message flow diagram of messages between the example assisted station 102, the example assistor station 104, and the access point 106 of FIGS. 1 and 2. The message flow diagram shows some example messages that may be exchanged to convey geographic location and establish the direct communication link 114 between the stations 102 and 104. While the message flow diagram shows messages that may support the IEEE 802.11v protocol, other examples may include messages that may support other communication protocols and/or standards.

Initially, as described in conjunction with FIG. 1, the assisted station 102 is within the BSS 108 and within range of the access point 106 (block 302). At this point, the assisted station 102 may transmit a measurement location request message 304. In other examples, the assisted station 102 may broadcast requests for data and/or may determine upon entering the BSS 108 that the assister station 104 has desired data. The access point 106 receives the message 304 and forwards the message 305 to any stations within a BSS of the access point, including the assister station 104. In other examples, the measurement location request message 304 may include a Location Configuration Information (LCI) request message that includes a request for a location of the assister station 104, a requested resolution of latitude, longitude, altitude and/or azimuth, and or the MAC address (e.g., originator requesting MAC address) of the assisted station 102.

In response to receiving the forwarded measurement location request message 305, the assister station 104 transmits a measurement location report message 306 including its geographic location. This geographic location may also include the azimuth of the assister station. In other examples, the measurement location report message 306 may include a LCI report message that includes the MAC address of the assistor station 104 within a target address field and the MAC address of the assisted station 102 within an originator requesting station MAC address field. In some examples, the assister station 104 may not generate the measurement location report message 306 unless the forwarded measurement location request message 305 includes the MAC address of the assister station 104 within a target address field. Additionally or alternatively, the assister station 104 may check for a trust relationship with the assisted station 102 prior to transmitting the measurement location report message 306.

Because the assisted station 102 is not within a direct communication range of the assister station 104, the access point 106 receives the message 306 and forwards the message 307 to the assisted station 102. The assisted station 102 may then use the received geographic information of the assister station 104 to calculate the path 112 to the assister station 104. The assisted station 102 may then move to within range of the assister station 104 and/or within the BSS 110 (block 308). At this point, the assisted station may transmit a measurement request message 310 to request a direct connection with the assister station 104. The measurement request message 310 may include the MAC address of the assister station 104 and/or the MAC address of the assisted station 102 and be transmitted directly to the assister station 104. In response to the message 310, the assister station 104 transmits a measurement report message 312 directly to the assisted station 102 that provides information to establish the direct communication link 114. The assisted station 102 may then transmit an association request message 314 to initiate the direct communication link 114. The direct communication link 114 may be established between the stations 102 and 104 upon the assister station 104 receiving the association request message 314 and initiating the direct communications.

Figure 4:
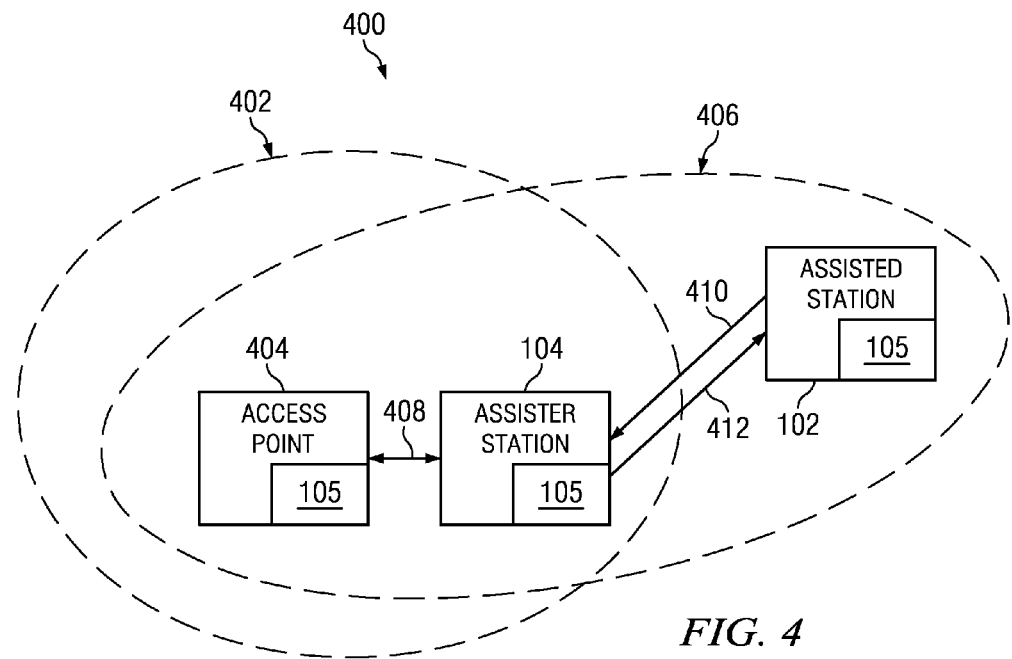
FIG. 4 shows an example assisted station outside a communication range of an access point.

FIG. 4 shows a communication network 400 with the example assisted station 102 of FIG. 1 outside a BSS 402 hosted by an access point 404. A second BSS 406 shows a range of the assister station 104. In this example, the access point 404 and the assister station 104 are included within the BSS 402, and the assisted station 102 and the assister station 104 are included within the BSS 406. Because the assisted station 102 is in a different BSS than the access point 404, the assisted station 102 cannot communicate directly with the access point 404.

In the example of FIG. 1, the assisted station 102 requests the geographic location of the assister station 104 to move within the BSS 110 of the assister station 104. In the example of FIG. 4, the assisted station 102 requests a geographic location of the access point 304 via the assister station 104 to move within the BSS of the access point 304. The example access point 404 is different from the access point 106 of FIGS. 1, 2, and/or 3 because the access point 404 may be GPS-enabled and include the peer-to-peer geographic location sharing capability. In some examples where the access point 404 is fixed, the geographic location may be entered manually into the access point 404. Alternatively, the access point 404 may determine its geographic location from a GPS receiver. Further, the stations 102 and 104 include GPS receivers that provide respective geographic locations.

In the example of FIG. 4, the assister station 104 may request geographic information from the access point 404 and establish a communication link 408. In this manner, the access point 404 may provide access to a network and/or the Internet. In other examples, the access point 404 may provide access to services. The assister station 104 may store the geographic location of the access point 404 to a memory register as long as the assister station 104 remains within the BSS 402. In other examples, the assister station 104 may store the geographic location of the access point 404 for a predetermined time period based on a frequency of the assister station 104 connecting to the access point 404.

The example assisted station 102 within the BSS 406 may desire to connect to a WLAN network, such as the WLAN network hosted by the access point 404 within the BSS 402. Because the assisted station 102 is outside the BSS 402, the assisted station 102 cannot reach the access point 404. To connect to the access point 404, the assisted station 102 transmits and/or broadcasts a location request message 410 asking for a geographic location of any access point hosting a WLAN. Because the assister station 104 is within the same BSS 406 as the assisted station 102, the assister station 104 may receive the message 410. If the assister station 104 is enabled to provide geographic location information and grants access, the assister station 104 may generate a report message 412 with the geographic location and/or the MAC address of the access point 404. In this example, because the assisted station 102 requests access to a WLAN, the assister station 104 provides the geographic location of the access point 404 instead of its own geographic location. In other examples where the access point 404 may not include GPS-capability, the assister station 104 may report with its own geographic location.

In examples where the assister station 104 may not have the MAC address and/or service information associated with the access point 404, the assisted station 102 may access a server via a cellular network and/or any other type of network to access the MAC address. In this manner, the access point 404 enables a trust relationship with the assisted station 102 by providing its MAC address to the server. For example, the access point 404 may provide its MAC address to a social network server. The assisted station 102 may access this social network server to determine the MAC address of the access point 404.

Figure 5:
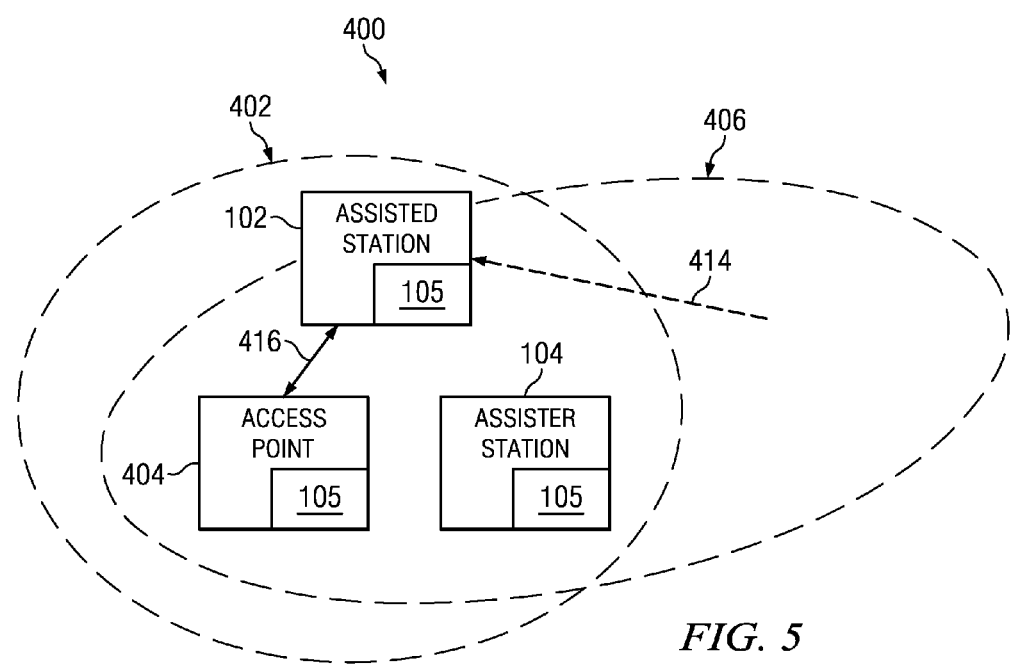
FIG. 5 shows the example assisted station of FIG. 4 within communication range of the access point.

FIG. 5 shows the example assisted station 102 of FIG. 4 within the BSS 402 hosted by the access point 404. In this example, the assisted station 102 may use the geographic location of the access point 404 and its own geographic location to calculate a path 414 to the BSS 402. The assisted station 102 may periodically update its geographic location while traveling along the path 414 to provide navigation updates to the user. Upon entering the BSS 402, the assisted station 102 may transmit a connection request to the access point 404. This request to connect may include a target MAC address of the access point 404 that may have been provided with the geographic location by the assister station 104 in FIG. 4.

In some examples, the assisted station 102 may determine it is within the BSS 402 by scanning for the access point 404 using the MAC address of the access point 404 provided by the assister station 104. After a time period, if the assisted station 102 does not detect the access point 404, the assisted station 102 may retransmit the location request message 410 to the assister station 104 and/or other location request messages to other stations and/or access points.

The access point 404 may then grant the request and communicatively couple to the assisted station 102 via a connection 416. Upon establishing the connection 416, the assisted station 102 may connect to the access point 404 and access a network, the Internet, and/or a service. In this manner, the assisted station 102 may reach the access point 404 that may be twice the distance from the maximum range of the access point 404.

The assisted station 102 may use geographic location for many different circumstances. In one example, a user of the assisted station 102 may want to make a relatively inexpensive phone call using Voice over WLAN. In another example a user of the assisted station 102 may desire to browse the Internet over WLAN. In yet another example, a user of the assisted station may desire to upload pictures to a social network site. In these examples, the user of the assisted station 102 may determine the location of the WLAN hosted by the access point 404 through geographic location sharing information with the assister station 104. The user may then move to the BSS 402 to access the WLAN to make the phone call, to browse the Internet, or to upload pictures.

In other examples, the access point 404 may be a mobile and/or portable 3G, 4G, and/or Wi-Fi enabled device that may host one or more services. In these examples, the assisted station 102 may connect to the access point 404 to access the hosted service. Alternatively, the access point 404 may include a wireless-enabled station. In these examples, the assister station 104 may use measurement location request messages or other discovery messages (e.g., Digital Living Network Alliance (DLNA) compliant messages) to determine geographic locations of proximate wireless stations. The wireless stations (e.g., the access point 404) may also include an identifier specifying a function of the station and/or services offered by the station. In some examples, the assisted station 102 may transmit a request for a geographic location of a station offering a particular service. Specifically, the assisted station 102 may desire to couple to a printer to print a document. The assister station 104 may receive a request from the assister station 102 asking for a location of a printer, determine if any proximate known wireless stations have printing capability, and transmit a MAC address and a geographic location of the stations within printing capability (e.g., the access point 404) to the assisted station 102. Using the geographic location, the assisted station 102 may guide a user to the printer.

In yet other examples, the access point 404 may send the connected assisted station 102 a geographic location of an adjacent access point in another BSS when the access point 404 detects network connection issues, network congestion, low bandwidth, and/or any other issue with the connection 416. The assisted station 102 may then use this geographic information to map a path to the next access point and guide the user to that location. The assisted station 102 may then connect to this adjacent access point.

Figure 6:
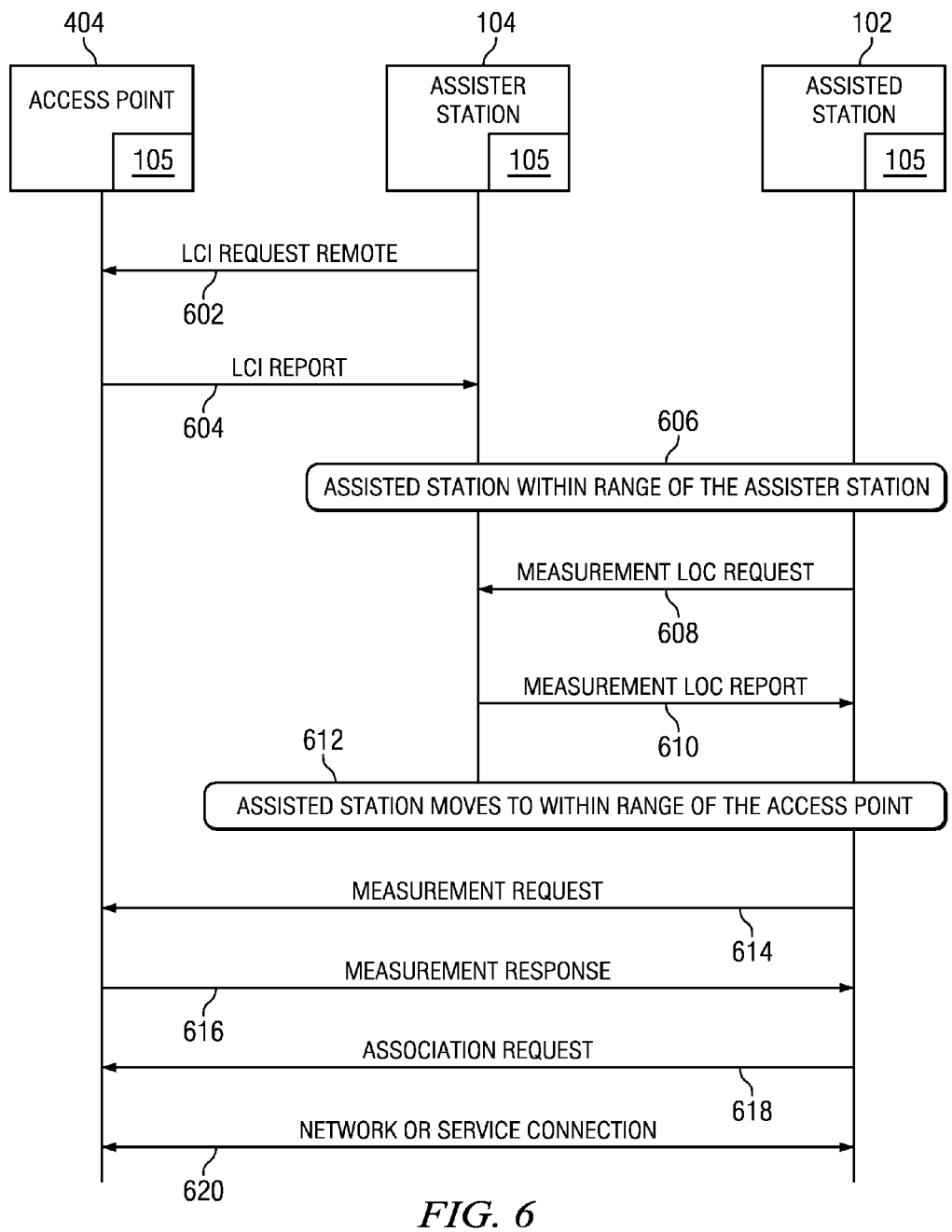
FIG. 6 shows a message flow diagram of messages between the example assisted station, the access point, and an example assistor station of FIGS. 4 and 5.

FIG. 6 shows a message flow diagram of messages between the example assisted station 102, the example assistor station 104, and the access point 404 of FIGS. 4 and 5. The message flow diagram shows some example messages that may be exchanged to convey geographic location and establish the connection 416 between the assisted station 102 and the access point 404. While the message flow diagram shows messages that may support the IEEE 802.11v protocol, other examples may include messages that may support other communication protocols and/or standards.

The assister station 104 first sends a LCI request remote message 602 to obtain the MAC address and the geographic location of the access point 404. The LCI request remote message may also be a request location message and/or a measurement location request message. In response to the message 602, the access point transmits an LCI report message 604 including its location information and MAC address. The assister station 104 may then store this information.

Next, the assisted station 102 moves within the BSS 406 of FIG. 4 by moving within range of the assister station (block 606). At this point, the assisted station 102 may then transmit a measurement location request message 608 requesting a geographic location of an access point. The assister station 104 receives the message 608, determines the request is asking for a location of an access point, accesses a memory register that includes the geographic location and/or MAC address of the access point 404, and transmits this information to the assisted station 102 via a measurement location report message 610.

Using the geographic location of the access point 404, the assisted station 102 calculates a direction and distance for the path 414 of FIG. 5. A user may then move along the path 414 until the assisted station 102 is within the BSS 402 (block 612). The assisted station 102 may then transmit a measurement request 614 to the access point 404 including the MAC address of the access point 404 and/or the MAC address of the assisted station 102. The access point 404 may then respond by transmitting a measurement response message 616 granting the assisted station to 102 connect. The assisted station 102 then transmits an association request message 618 that the access point 404 may use to establish the connection 620. At this point, the assisted station 102 may utilize the access point 404 to access a network (e.g., a WLAN), the Internet, and/or a service hosted by the access point 404 via the connection 620.

Figure 7:
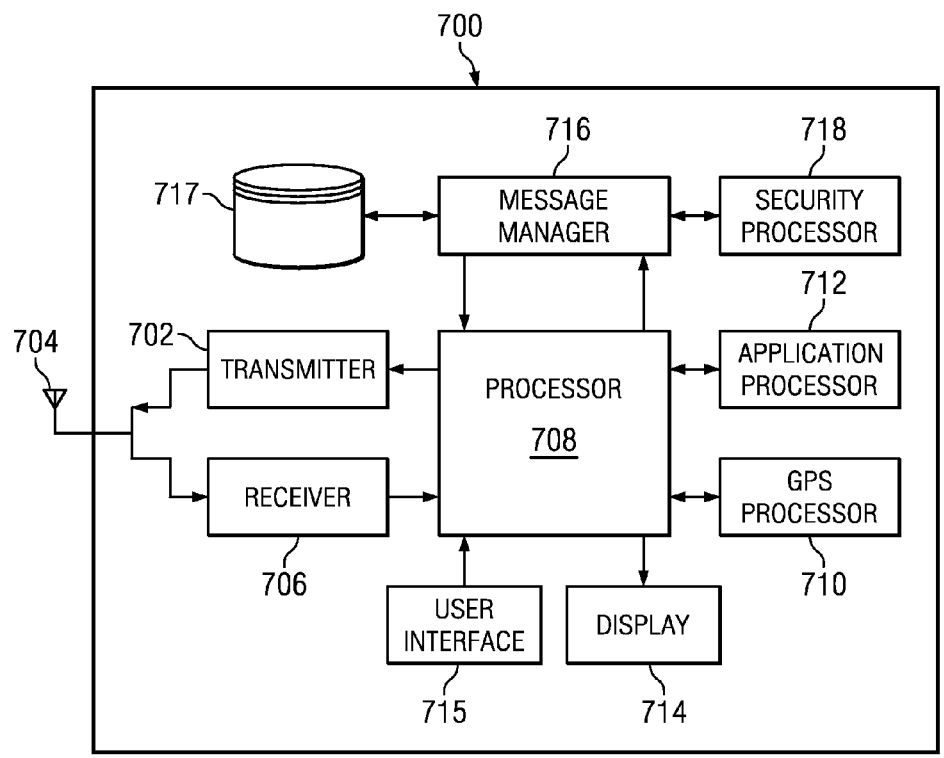
FIG. 7 shows a block diagram of the example assistor station and/or the example assisted station of FIGS. 1, 2, 3, 4, 5, and/or 6.

FIG. 7 is a block diagram of a wireless station 700 that may include the example assistor station 104 and/or the example assisted station 104 of FIGS. 1, 2, 3, 4, 5, and/or 6. The functional blocks shown within the wireless station 700 may be used to provide the peer-to-peer geographic location sharing capability 105. To transmit messages such as, for example, a LOC request message, a location request message, an association request message, a location report message, an LOC report message, a measurement location report message, and/or the measurement location request message, the wireless station 700 includes a transmitter 702. The example transmitter 702 may also transmit data and/or protocol messages to establish a connection. Further, the transmitter may be implemented using a wireless communication medium (e.g., wireless Ethernet, IEEE-802.11, Wi-Fi®, Bluetooth®, etc.).

The example transmitter 702 converts digital and/or analog data and/or messages into a wireless signal for transmission via an antenna 704. The antenna may then transmit the wireless signal to other wireless stations and/or access points. The example antenna 704 may include any type of antenna and/or may include one or more different types of antennas. The antenna 704 also receives wireless signals from other stations and/or access points.

To convert a wireless signal received by the antenna 704 to digital and/or analog messages and/or data, the example wireless station 700 includes a receiver 706. The wireless signal may also include a GPS satellite signal. Upon converting a wireless signal into corresponding data and/or messages, the receiver forwards the data and/or messages to a processor 708. In some examples, the receiver 706 may also queue data and/or messages until the processor 708 is available.

The example processor 708 manages the routing of data and/or messages to an appropriate functional block. For example, GPS satellite signals received by the antenna 704 may be forwarded by the processor 708 to a GPS processor 710. The GPS processor 710 may include a GPS receiver that calculates latitude, longitude, and/or altitude of the wireless station 700. The GPS processor 710 may update the geographic location of the wireless station 700 as the wireless station 700 moves. Additionally, the GPS processor 710 may calculate a path (e.g., a distance and/or a direction) to an assister station and/or an access point based on a geographic location requested by and/or reported to the wireless station 700.

The GPS processor 710 may calculate a path by calculating a difference in the latitude, longitude, and/or altitude between the currently known geographic location of the wireless station 700 and the reported geographic location of a wireless device (e.g., an access point or another wireless station). The GPS processor 710 may then calculate a path based on the calculated differences. Additionally, the GPS processor 710 may calculate an estimated range of a BSS of the access point and/or the wireless station based on a difference between the reported azimuth and the azimuth of the wireless station 700. The GPS processor 710 forwards the calculated path and azimuth difference to the processor 708.

To utilize the path information calculated by the GPS processor 710, the example wireless station 700 includes an application processor 712. The application processor 712 operates applications that may use the path information to direct a user of the wireless station 700 to the desired geographic location. For example, the application processor 712 may operate a mapping program (e.g., Google Maps) that graphically displays the path location from the GPS processor 710. In another example, a direction application may use the path information to provide turn-by-turn directions to a user to find a desired wireless device. The application processor 712 may transmit the application information to the processor 708 for display within a display 714 of the wireless station 700. The example display 714 may include any type of display used within wireless devices.

The example display 714 may operate in combination with and/or in conjunction with a user interface 715. The example user interface 715 provides a user capability to enter information into the wireless station 700. The user interface 715 may include a touch screen included within the display 714 and/or buttons, a keypad, and/or a scroll wheel that may be used to enter information. Upon receiving information from a user, the user interface 715 forwards the information to the processor 708 to distribute.

The example application processor 712 may also operate applications that a user of the wireless station 700 may use upon communicatively coupling to an access point and/or another wireless station. For example, the application processor 712 may operate a filing sharing program that locates other wireless stations with desired data. When the wireless station 700 is with within range of the other wireless stations, the file sharing program on the application processor 712 may manage the transfer of the data. In another example, the application processor 712 may operate applications that may utilize a service provided by an access point. In these examples, a mobile access point may download media that may then be played on a media application operated by the application processor 712. Further, in some examples where the wireless station 700 functions as a mobile 3G, 4G, and/or Wi-Fi access point, the application processor 712 may host and/or operate services that may be accessed by other wireless stations. Additionally, the application processor 712 may detect and/or determine an issue with a connection with another wireless station and/or an access point based on latent and/or no responses to requests by an application.

To process messages for determining geographic locations and establishing communication with wireless devices, the example wireless station 700 includes a message manager 716. The example message manager 716 receives messages (e.g., the messages 302, 304, 307, 306, 307, 310, 312, and/or 314 of FIG. 3 and the messages 602, 604, 606, 608, 610, 614, 616, 618, and/or 620 of FIG. 6) from the processor 708 and determines an appropriate action based on the received message. In some examples, the message manager 716 may receive a request to generate a measurement location request message in response to a user desiring to connect to a WLAN.

Upon receiving the request, the message manager 716 accesses registers in a memory 717 that may include a table of octets with information that may be used for obtaining a geographic location of another wireless device. The message manager 716 may then generate the measurement location request message using the accessed information within headers of the message. The table within the memory 717 may be defined according to the IEEE 802.11v specification and/or any other protocol and/or standard. Further, the memory 717 may be implemented by Electronically Erasable Programmable Read-Only Memory (EEPROM), Random Access Memory (RAM), Read-Only Memory (ROM), and/or any other type of memory.

In some examples, the message manager 716 may create a measurement location request message by including in a header of the message a MAC address of the wireless station 700 and/or indicating via a specified bit within the message if the message is also requesting the azimuth of the wireless device. In other examples, the message manager 716 may include a MAC address of a target access point and/or wireless station to address a message to a particular device and/or to request a geographic location of a particular device. The MAC address of the wireless station 700 and/or MAC addresses of target wireless devices may be stored within the memory 717. In yet other examples, the message manager 716 may receive location request messages for a geographic location of the wireless station 700. In these examples, the message manager 716 may access the memory 717 for the MAC address and the geographic location of the wireless station 700 and generate a report location message. Alternatively, the message manager 716 may access the geographic location from the GPS processor 710.

The example message manager 716 may also store a list of MAC addresses and/or any associated identifying information of wireless-enabled devices that are within a wireless range of the wireless station 700. For example, the message manager 716 may periodically broadcast location request messages to any in-range wireless device. The message manager 716 may process location report messages from any devices that respond and parse and store within the memory 717 geographic location information, a MAC address, and any identification information. Then, if the message manager 716 receives a location request message, and/or a measurement location request message from any other wireless station, the message manager 716 may determine if one of the listed devices corresponds to the request. If the message manager 716 matches at least one device, the message manager 716 may generate a report location message providing the MAC address of the device, the geographic location of the device, and/or any identifying information associated with the device.

The example message manager 716 of FIG. 7 may also generate messages for establishing a connection to another wireless station and/or access point. For example, the message manager 716, upon receiving a location report message and/or a measurement location report message, may determine that the reporting wireless device is within range and generates a measurement request message using the MAC address of the wireless station 700 and/or any other wireless protocol information associated with the wireless station 700 stored within the memory 717. The message manager 716 may also generate association request messages to communicatively couple to a wireless device. The association request message may include information to create a direct communication link with another wireless station and/or information to access a network and/or service(s) hosted by the access point.

To determine trust relationships, the example wireless station 700 includes a security processor 718. The example security processor 718 may review requests to provide geographic information from other wireless stations and access the memory 717 to determine if a trust relationship exists with that station. If a trust relationship does exist, the example security processor 718 may enable the message manager 716 to send a location report message including the geographic location. The example security processor 718 may also manage a list of trust relationships stored within the memory 717. This list may be used by the security processor 718 to relatively quickly authenticate a request for the geographic location of the wireless station 700, to establish a direct communication link with the wireless station 700, and/or to access a service hosted by the wireless station 700.

The example security processor 718 may manage this list based on which wireless stations are expressly granted permission by a user of the wireless station 700 via the user interface 715. In other examples, the security processor 718 may manage the list based on social networking contacts of the user provided by the application processor 712. The list may include a MAC address and/or any identifier information associated with the trusted station. In instances where the security processor 718 is not able to match a request to a MAC address on the list, the security processor 718 may prompt a user of the wireless station 700 to authenticate the request. The security processor 718 may then store the MAC address and/or any identification information to the list within the memory 717.

While an example manner of implementing the wireless station 700 is depicted in FIG. 7, one or more of the interfaces, data structures, elements, processes and/or devices illustrated in FIG. 7 may be combined, divided, rearranged, omitted, eliminated and/or implemented in any other way. For example, the example transmitter 702, the example antenna 704, the example receiver 706, the example processor 708, the example GPS processor 710, the example application processor 712, the example display 714, the example user interface 715, the example message manager 716, the example memory 717, and/or the example security processor 718 illustrated in FIG. 7 may be implemented separately and/or in any combination using, for example, machine-accessible or readable instructions executed by one or more computing devices and/or computing platforms (e.g., the example processing platform P100 of FIG. 10).

Further, the example transmitter 702, the example antenna 704, the example receiver 706, the example processor 708, the example GPS processor 710, the example application processor 712, the example display 714, the example user interface 715, the example message manager 716, the example memory 717, the example security processor 718 and/or, more generally, the example wireless station 700 may be implemented by hardware, software, firmware and/or any combination of hardware, software and/or firmware. Thus, for example, any of the example transmitter 702, the example antenna 704, the example receiver 706, the example processor 708, the example GPS processor 710, the example application processor 712, the example display 714, the example user interface 715, the example message manager 716, the example memory 717, the example security processor 718 and/or, more generally, the example wireless station 700 can be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus claims are read to cover a purely software implementation, at least one of the example transmitter 702, the example antenna 704, the example receiver 706, the example processor 708, the example GPS processor 710, the example application processor 712, the example display 714, the example user interface 715, the example message manager 716, the example memory 717, and/or the example security processor 718 are hereby expressly defined to include a tangible medium such as a memory, DVD, CD, etc. Further still, the example wireless station 700 of FIG. 7 may include one or more elements, processes and/or devices in addition to, or instead of, those illustrated in FIG. 7, and/or may include more than one of any or all of the illustrated elements, processes and devices.

FIGS. 8A, 8B, 9A, and 9B depict example flow diagrams representative of processes that may be implemented using, for example, computer readable instructions that may be used to locate a wireless device. The example processes of FIGS. 8A, 8B, 9A, and 9B may be performed using a processor, a controller and/or any other suitable processing device. For example, the example processes of FIGS. 8A, 8B, 9A, and 9B may be implemented using coded instructions (e.g., computer readable instructions) stored on a tangible computer readable medium such as a flash memory, a read-only memory (ROM), and/or a random-access memory (RAM). As used herein, the term tangible computer readable medium is expressly defined to include any type of computer readable storage and to exclude propagating signals. Additionally or alternatively, the example processes of FIGS. 8A, 8B, 9A, and 9B may be implemented using coded instructions (e.g., computer readable instructions) stored on a non-transitory computer readable medium such as a flash memory, a read-only memory (ROM), a random-access memory (RAM), a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, some or all of the example processes of FIGS. 8A, 8B, 9A, and 9B may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example processes of FIGS. 8A, 8B, 9A, and 9B may be implemented manually or as any combination(s) of any of the foregoing techniques, for example, any combination of firmware, software, discrete logic and/or hardware. Further, although the example processes of FIGS. 8A, 8B, 9A, and 9B are described with reference to the flow diagrams of FIGS. 8A, 8B, 9A, and 9B, other methods of implementing the processes of FIGS. 8A, 8B, 9A, and 9B may be employed. For example, the order of execution of the blocks may be changed, and/or some of the blocks described may be changed, eliminated, sub-divided, or combined. Additionally, any or all of the example processes of FIGS. 8A, 8B, 9A, and 9B may be performed sequentially and/or in parallel by, for example, separate processing threads, processors, devices, discrete logic, circuits, etc.

Figure 8A:
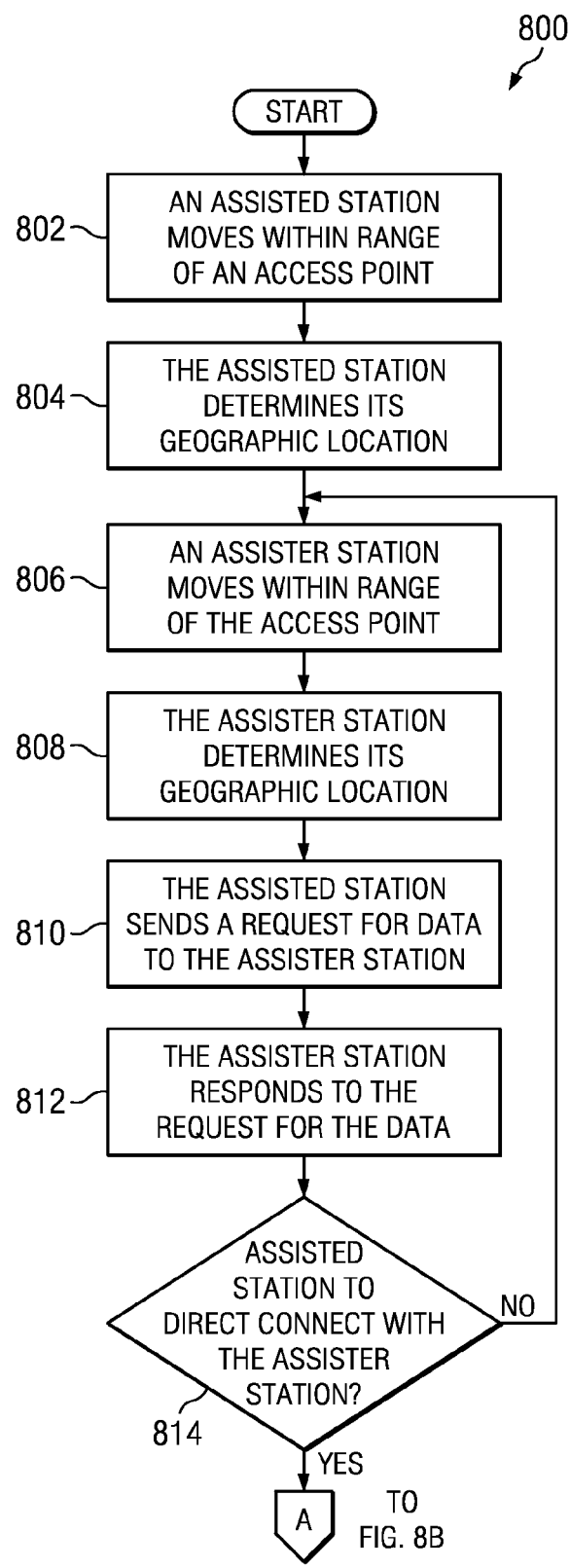
FIGS. 8A, 8B, 9A, and 9B are flowcharts representative of processes that may be carried out by example machine-accessible instructions that may be executed to implement the example assisted station, the example assistor station, and/or the access point of FIGS. 1, 2, 3, 4, 5, 6, and/or 7.
Figure 8B:
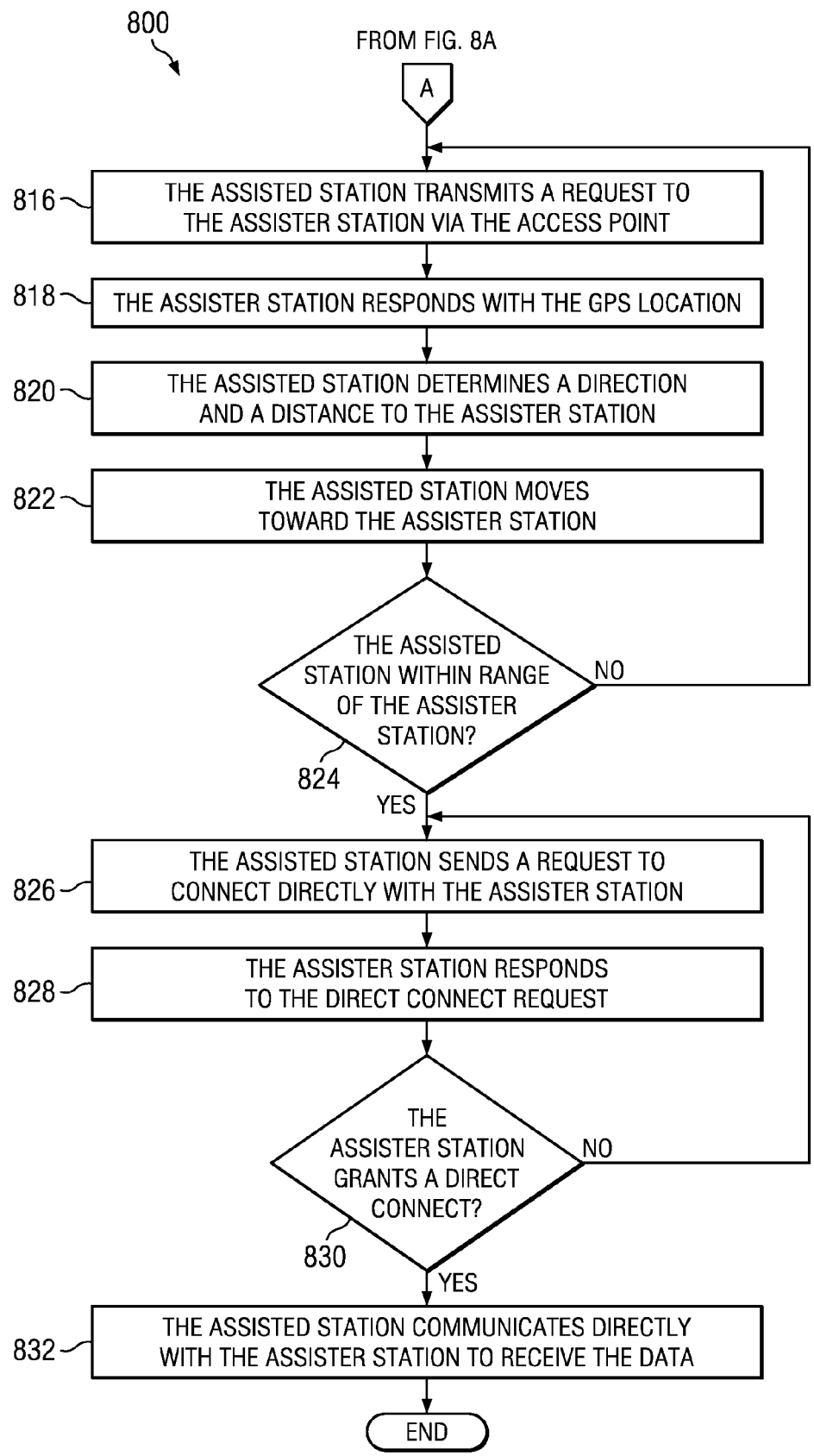

The example instructions 800 of FIGS. 8A and 8B share geographic location information between two wireless stations so that the stations may create a direct communication link. Multiple instances of the example instructions 800 may be executed in parallel or series to create direct communication links between other wireless stations.

The example instructions 800 of FIG. 8A begin by an assisted station (e.g., the assisted station 102 of FIGS. 1-6) moving within range and/or a BSS hosted by an access point (block 802). The example instructions 800 (e.g., via the GPS processor 710 of FIG. 7) cause the assisted station to determine its geographic location (block 804). Next, an assister station (e.g., the assister station 104 of FIGS. 1-6) moves within range and/or the BSS hosted by the access point (block 806). However, the assisted station and the assister station are not within range of each other. The example instructions 800 (e.g., via the GPS processor 710 of FIG. 7) cause the assister station to determine its geographic location (block 808).

The example instructions 800 (e.g., via the application processor 710) may cause the assisted station to send a request message for desired data to the assister station via the access point (block 810). The example instructions 800 (e.g., via the application processor 710) may cause the assisted station to receive a response from the assister station indicating the presence of the desired data (block 812). Next, the example instructions 800 (e.g., via the application processor 712) determine whether to make a direct connection with the assister station (block 814). If the assisted station determines not to make a direct connection, the example instructions 800 return to waiting for another assister station moving within range of the BSS hosted by the access point (block 806).

However, if the assisted station determines to make a direct connect to access the data, the examples instructions 800 (e.g., via the message manager 716) continue in FIG. 8B by transmitting a measurement location request message to the assister station via the access point (block 816). Next, the example instructions 800 (e.g., via the message manager 716) receive the measurement location report message from the assister station including the GPS location of the assister station (block 818). The example instructions 800 (e.g., via the GPS processor 710) determine a direction and/or a distance (e.g., a path) to the assister station (block 820). The example instructions 800 (e.g., via the GPS processor 710 and/or the application processor 712) track the assisted station as the user moves toward the assister station along the calculated path (block 822). The example instructions 800 (e.g., via the GPS processor 710, the application processor 712, and/or the message manager 716) may determine if the assisted station is within range of the assister station (block 824). If the assisted station is not within range of the assister station, the example instructions 800 return to transmitting a measurement location request message to re-determine the geographic location of the assister station (block 816).

However, if the example instructions 800 determine the assisted station is within range, the example instructions 800 (e.g., via the message manager 716) transmit a measurement request to connect directly with the assister station (block 826). The example instructions 800 (e.g., via the message manager 716) may then receive a measurement report and/or response from the assister station (block 828). Next, the example instructions 800 (e.g., via the security processor 718) may then determine if the assister station granted the grant connection in the report message (block 830). If the assister station did not grant a connection, the example instructions 800 may re-transmit a request message to connect. However, if the assister station granted a connection, the example instructions 800 (e.g., via the message manager 716 and/or the application processor 712) may establish a direct communication link with the assister station and receive the desired data (block 832). Upon receiving the data, the example instructions 800 may end.

Figure 9A:
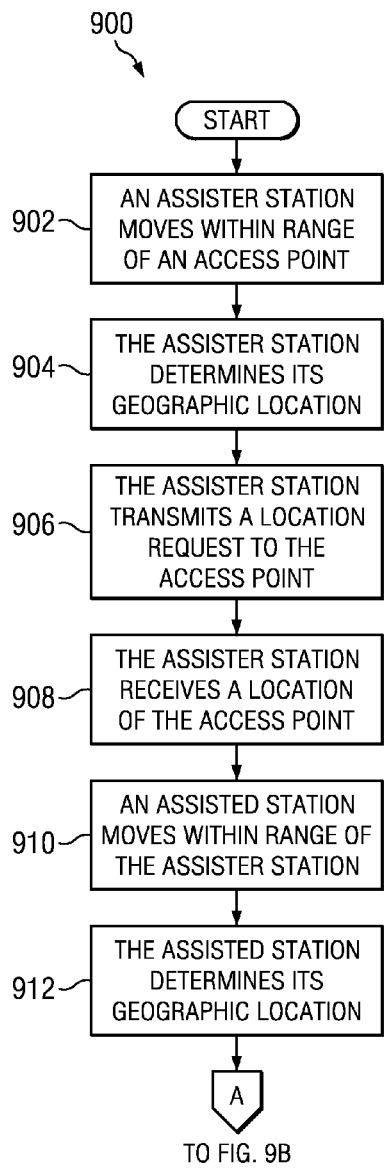
Figure 9B:
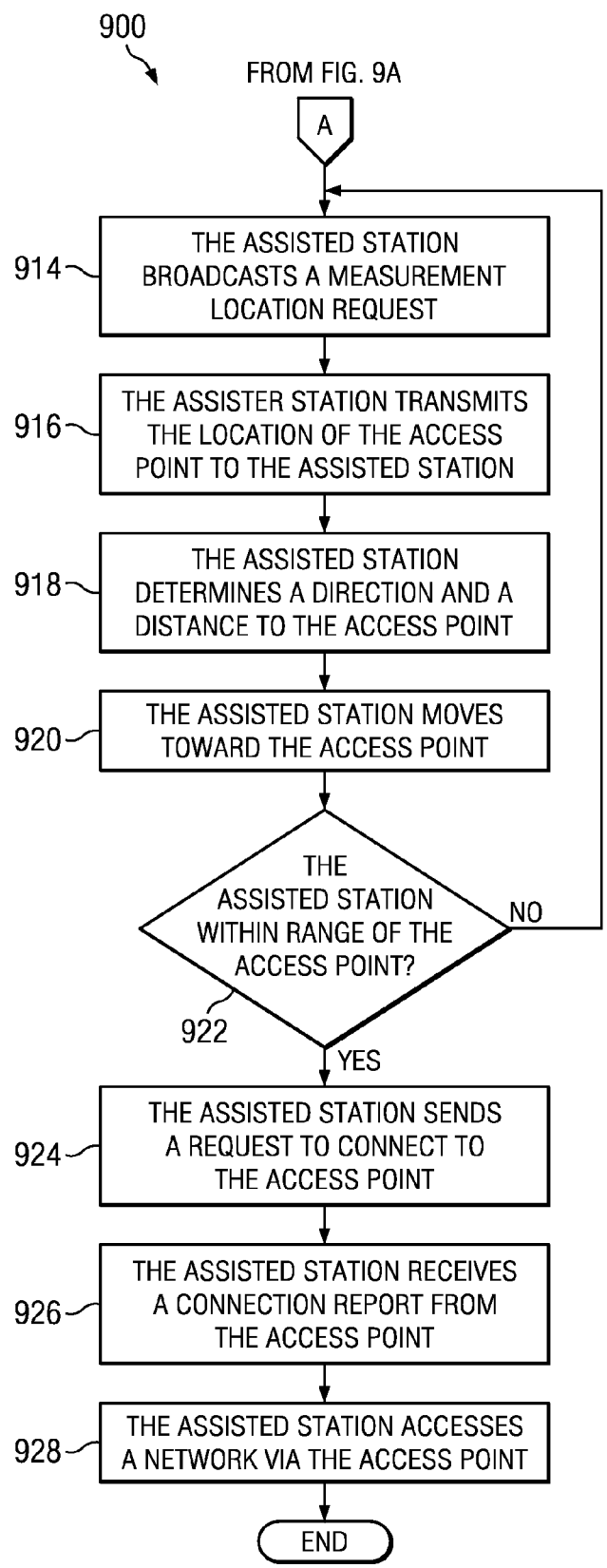

The example instructions 900 of FIGS. 9A and 9B share geographic location information between two wireless stations so that an assisted station may connection to an access point outside of the range of the assisted station. Multiple instances of the example instructions 900 may be executed in parallel or series to establish connections between wireless stations and access points.

The example instructions 900 of FIG. 9A begin by an assister station moving within range and/or a BSS of an access point (block 902). The example instructions 900 (e.g., via the GPS processor 710 of FIG. 7) may then cause the assister station to determine its geographic location (block 904). The example instructions 900 (e.g., via the message manager 716) then transmit a location request (e.g., a LCI request message) to the access point (block 906). The example instructions 900 (e.g., via the message manager 716) may receive a report message (e.g., a LCI report) from the access point including a MAC address and a geographic location of the access point (block 908). An assisted station then moves within range of the assister station but outside the BSS of the access point (block 910). The example instructions 900 (e.g., via the GPS processor 710 of FIG. 7) cause the assisted station to determine its geographic location (block 912).

The example instructions 900 (e.g., via the message manager 716) continue in FIG. 9B by transmitting and/or broadcasting a measurement location request message to ask for a location of an access point (block 914). The example instructions 900 (e.g., via the message manager 716) may then receive from the assister station the MAC address and/or the geographic location of the access point (block 916). The example instructions 900 (e.g., via the GPS processor 710) determine a direction and/or a distance (e.g., a path) to the access point based on the received geographic location (block 918). The example instructions 900 (e.g., via the GPS processor 710 and/or the application processor 712) may then track the assisted station as the user moves toward the access point along the calculated path (block 920).

The example instructions 900 (e.g., via the GPS processor 710, the application processor 712, and/or the message manager 716) may then determine if the assisted station is within range of the access point (block 922). If the assisted station is not within range of the access point, the example instructions 900 return to transmitting a measurement location request message to re-determine the geographic location of the access point (block 914).

However, if the example instructions 900 determine the assisted station is within range, the example instructions 900 (e.g., via the message manager 716) transmit a measurement request to connect to the access point (block 924). The example instructions 900 (e.g., via the message manager 716) may then receive a measurement report and/or response from the access point (block 926). The example instructions 900 (e.g., via the message manager 716 and/or the application processor 712) may then connect the assisted station to a network and/or a service hosted by the access point (block 928). The example instructions 900 may then end.

Figure 10:
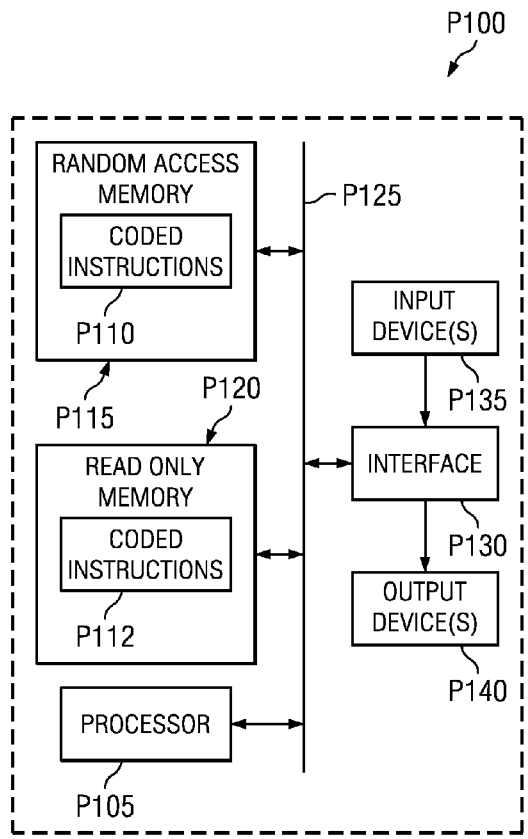
FIG. 10 is a schematic illustration of an example processor platform that may be used and/or programmed to execute the example processes of FIGS. 8A-9B to implement any of all of the example methods and apparatus disclosed herein.

FIG. 10 is a schematic diagram of an example processor platform P100 that may be used and/or programmed to execute the instructions of FIGS. 8A, 8B, 9A, and/or 9B to implement the example transmitter 702, the example antenna 704, the example receiver 706, the example processor 708, the example GPS processor 710, the example application processor 712, the example display 714, the example user interface 715, the example message manager 716, the example memory 717, the example security processor 718 and/or, more generally, the example wireless stations 102, 104, and/or 700 of FIGS. 1, 2, 3, 4, 5, 6 and/or 7. For example, the processor platform P100 can be implemented by one or more general-purpose processors, processor cores, microcontrollers, etc.

The processor platform P100 of the example of FIG. 10 includes at least one general purpose programmable processor P105. The processor P105 executes coded instructions P110 and/or P112 present in main memory of the processor P105 (e.g., within a RAM P115 and/or a ROM P120). The coded instructions P110 and/or P112 may be the instructions of FIGS. 8A, 8B, 9A, and/or 9B. The processor P105 may be any type of processing unit, such as a processor core, a processor and/or a microcontroller. The processor P105 may execute, among other things, the example processes of FIGS. 8A, 8B, 9A, and/or 9B to implement the example methods, articles of manufacture, and apparatus described herein.

The processor P105 is in communication with the main memory (including a ROM P120 and/or the RAM P115) via a bus P125. The RAM P115 may be implemented by DRAM, SDRAM, and/or any other type of RAM device, and ROM may be implemented by flash memory and/or any other desired type of memory device. Access to the memory P115 and the memory P120 may be controlled by a memory controller (not shown). One or both of the example memories P115 and P120 may be used to implement the example memory 717 of FIG. 7.

The processor platform P100 also includes an interface circuit P130. The interface circuit P130 may be implemented by any type of interface standard, such as an external memory interface, serial port, general-purpose input/output, etc. One or more input devices P135 and one or more output devices P140 are connected to the interface circuit P130.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are stored on a tangible storage medium, such as: a magnetic medium (e.g., a magnetic disk or tape); a magneto-optical or optical medium such as an optical disk; or a solid state medium such as a memory card or other package that houses one or more read-only (non-volatile) memories, random access memories, or other re-writable (volatile) memories. Accordingly, the example software and/or firmware described herein can be stored on a tangible storage medium such as those described above or successor storage media.

To the extent the above specification describes example components and functions with reference to particular standards and protocols, it is understood that the scope of this patent is not limited to such standards and protocols. For instance, each of the standards for internet and other packet-switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example apparatus including software or firmware executed on hardware, it should be noted that such apparatus are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example apparatus, methods and articles of manufacture, the examples are not the only way to implement such apparatus, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to locate a wireless device, the method comprising:
    transmitting a request location message from a first wireless station to a second wireless station to determine a geographic location of a third wireless station;
    receiving a response location message at the first wireless station from the second wireless station identifying the geographic location of the third wireless station, wherein the second wireless station stores the geographic location of the third wireless station;
    determining a path from the first wireless station to a range of the third wireless station based on the received geographic location of the third wireless station;
    moving along a portion of the path with the first wireless station to the range of the third wireless station; and
    transmitting an association message from the first wireless station to the third wireless station to communicably couple the first wireless station to the third wireless station.

2. A method as defined in claim 1, further comprising:
    transmitting a second request location message from the second wireless station to the third wireless station prior to transmitting the request location message from the first wireless station;
    receiving a second response location message in the second wireless station from the third wireless station, wherein the second response location includes the geographic location of the third wireless station; and
    storing the geographic location of the third wireless station within the second wireless station.

3. A method as defined in claim 1, further comprising:
    downloading data to the third wireless station requested by the first wireless station;
    caching the data on the third wireless station; and
    forwarding the cached data to the first wireless station.

4. A method as defined in claim 1, further comprising, prior to transmitting the response location message:
    determining if a trust relationship is established with the first wireless station; and
    prompting a user of the second wireless station to grant permission to transmit the response location message if the trust relationship is not established.

5. A method as defined in claim 4, wherein determining the trust relationship includes accessing a server with the first wireless station to determine a media access control address of the third wireless station.

6. A method as defined in claim 1, wherein transmitting the association message includes:

transmitting a measurement request message from the first wireless station to the third wireless station for network connection information; and receiving a measurement response message in the first wireless station from the third wireless station.

7. A method as defined in claim 1, further comprising:

transmitting a request for data from the first wireless station to the third wireless station via the second wireless station prior to transmitting the request location message;

receiving a data response at the first wireless station from the third wireless station via the second wireless station indicating a presence of the data on the third wireless station; and upon communicatively coupling the first wireless station to the third wireless station, receiving the requested data from third wireless station at the first wireless station via a direct wireless communication connection.

8. A method as defined in claim 1, further comprising, determining a geographic location of the first wireless station and a geographic location of the second wireless station.

9. A method as defined in claim 8, wherein the path is determined by determining a distance and a direction to the third wireless station based on the geographic location of the third wireless station and the geographic location of the first wireless station.

10. A method as defined in claim 1, further comprising, upon communicatively coupling the first wireless station to the third wireless station:

determining network congestion at the third wireless station interfering with communications with the first wireless station;

receiving a third response location message at the first wireless station providing a second geographic location of a fourth wireless station, the third wireless station storing a second geographic location of the fourth wireless station;

determining a second path from the first wireless station to a second range of the fourth wireless station based on the received second geographic location of the fourth wireless station;

moving along a portion of the second path with the first wireless station to the second range; and transmitting a second association message from the first wireless station to the fourth wireless station to communicably couple the first wireless station to the fourth wireless station.

11. A method as defined in claim 1, wherein the request location message includes a media access control address of the first wireless station and the response location message includes a media access control address of the third wireless station.

12. A method as defined in claim 1, wherein the geographic location is at least programmed into the third wireless station or determined by a global positioning system included within the third wireless station.

13. A method as defined in claim 1, wherein the third wireless station is at least one of a geographically fixed access point or a mobile wireless area network access point.

14. A method as defined in claim 1, further comprising, updating the path to the third wireless station by determining a geographic location of the first wireless station while the first wireless station is moving.

15. A method as defined in claim 1, further comprising:

transmitting a broadcast location request message from the third wireless station;

receiving a third response location message from each wireless station within the range of the third wireless station, wherein the third response location message includes a geographic location for the corresponding wireless station within the range of the third wireless station; and providing a list including the geographic locations of the corresponding wireless stations within the range of the third wireless station of the first wireless station.

16. A machine-accessible medium having instructions stored thereon that, when executed, cause a machine to:

transmit a request for data from a first wireless station to a third wireless station via a second wireless station;

receive a data response at the first wireless station from the third wireless station via the second wireless station indicating a presence of the data on the third wireless station;

transmit a request location message from the first wireless station to the second wireless station to determine a geographic location of the third wireless station;

receive a response location message at the first wireless station from the second wireless station identifying the geographic location of the third wireless station;

determine a path from the first wireless station to a range of the third wireless station based on the received geographic location of the third wireless station;

move along a portion of the path with the first wireless station to the range of the third wireless station;

transmit an association message from the first wireless station to the third wireless station to communicably couple the first wireless station to the third wireless station; and receive the requested data from third wireless station at the first wireless station via a direct wireless communication connection.

17. A machine-accessible medium as defined in claim 16, wherein the instructions, when executed, cause the machine to:

transmit a second request location message from the second wireless station to the third wireless station prior to transmitting the request location message from the first wireless station;

receive a second response location message in the second wireless station from the third wireless station, wherein the second response location includes the geographic location of the third wireless station; and store the geographic location of the third wireless station within the second wireless station.

18. A machine-accessible medium as defined in claim 16, wherein the instructions, when executed, cause the machine to:

determine network congestion at the third wireless station interfering with communications with the first wireless station;

receive a third response location message at the first wireless station providing a second geographic location of a fourth wireless station, determine a second path from the first wireless station to a second range of the fourth wireless station based on the received second geographic location of the fourth wireless station;

move along a portion of the second path with the first wireless station to the second range; and transmit a second association message from the first wireless station to the fourth wireless station to communicably couple the first wireless station to the fourth wireless station.

* * * * *